(12) United States Patent
Al-Khudairi et al.

(10) Patent No.: US 8,730,921 B2
(45) Date of Patent: May 20, 2014

(54) SYSTEM AND METHOD FOR CALL RE-ESTABLISHMENT

(75) Inventors: Abdul-Munem Al-Khudairi, Waterloo (CA); Noushad Naqvi, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 761 days.

(21) Appl. No.: 12/550,175

(22) Filed: Aug. 28, 2009

(65) Prior Publication Data

US 2011/0053588 A1 Mar. 3, 2011

(51) Int. Cl.
*H04W 4/00* (2009.01)
*H04W 36/30* (2009.01)
*H04W 36/24* (2009.01)
*H04W 36/34* (2009.01)
*H04W 36/36* (2009.01)

(52) U.S. Cl.
CPC ............. *H04W 36/30* (2013.01); *H04W 36/24* (2013.01); *H04W 36/34* (2013.01); *H04W 36/36* (2013.01)
USPC ............ 370/332; 370/310; 370/328; 370/331

(58) Field of Classification Search
CPC ...... H04W 36/24; H04W 36/30; H04W 36/36
See application file for complete search history.

(56) References Cited

U.S. PATENT DOCUMENTS

| | | | |
|---|---|---|---|
| 4,144,496 A * | 3/1979 | Cunningham et al. | 455/447 |
| 5,701,586 A * | 12/1997 | Tabbane et al. | 455/422.1 |
| 5,722,072 A | 2/1998 | Crichton et al. | |
| 2006/0035662 A1 * | 2/2006 | Jeong et al. | 455/525 |
| 2009/0233600 A1 * | 9/2009 | Johansson et al. | 455/435.2 |
| 2010/0124203 A1 * | 5/2010 | Tenny et al. | 370/331 |

FOREIGN PATENT DOCUMENTS

| | | | | |
|---|---|---|---|---|
| WO | WO9312623 A1 | 6/1993 | | |
| WO | WO 97/31487 | * | 8/1997 | |
| WO | WO9731487 A2 | 8/1997 | | |
| WO | WO2006097810 A1 | 9/2006 | | |
| WO | WO2009096883 A1 | 8/2009 | | |
| WO | WO 2009096883 A1 | * | 8/2009 | ............ H04W 36/30 |
| WO | WO2010057128 A1 | 5/2010 | | |

OTHER PUBLICATIONS

3gPP 44.018 V7.9.0, Jun. 2007, "Digital cellular telecommunications system (Phase 2+); Mobile radio interface layer 3 specification; Radio Resource Control (RRC) protocol (3GPP TS 44.018 version 7.9.0 Release 7)".*

(Continued)

*Primary Examiner* — Kibrom T Hailu
*Assistant Examiner* — James P Duffy
(74) *Attorney, Agent, or Firm* — Quarles & Brady LLP

(57) ABSTRACT

A method for implementing call re-establishment using a user equipment (UE) configured to communicate with a wireless communication network includes detecting at least one of a radio link failure and a protocol failure of a connection between the UE and a serving cell. A target cell of the wireless communication network is selected and a received signal level for the target cell is compared to a signal level threshold. When the received signal level for the target cell exceeds the signal level threshold, call re-establishment is initiated on the target cell. The signal level threshold may be encoded within a system information type 21bis message, or a system information element. In some cases, the signal level threshold is equal to a minimum signal level required on the target cell.

19 Claims, 8 Drawing Sheets

(56) References Cited

OTHER PUBLICATIONS

PCT International Search Report and Written Opinion, PCT/CA2010/001298, Nov. 26, 2010.

Ericsson, Inter System Handover and Cell Re-Selection, 3rd Generation Partnership Project (3GPP); Technical Specification Group (TSG-RAN); Workgroup 2, RPA000032, Turin, Italy, Feb. 9-11, 2000.

* cited by examiner

SYSTEM AND METHOD FOR CALL RE-ESTABLISHMENT

BACKGROUND

The present disclosure relates generally to data transmission in mobile communication systems and more specifically to an improved system and method for call re-establishment.

As used herein, the terms "User Equipment" and "UE" can refer to wireless devices such as mobile telephones, personal digital assistants, handheld or laptop computers, and similar devices or other user agents ("UA") that have telecommunications capabilities. In some embodiments, a UE may refer to a mobile, wireless device. The term "UE" may also refer to devices that have similar capabilities but that are not generally transportable, such as desktop computers, set-top boxes, or network nodes.

In a GSM (Global System for Mobile communications) system, a UE making a voice call may track a radio link counter, which is used to ensure the quality of the radio link (see, for example, 3GPP TS 45.008 Section 5.2). The radio link counter is used to measure the quality on the Slow Associated Control Channel (SACCH) associated with a connection (which may be used to carry a voice call). The SACCH is defined in 3GPP TS 45.002. At the start of a call, after handover, and after re-assignment, the radio link counter "S" is initialized to a network-defined Radio Link Timeout (RLT) value. After every bad SACCH block, S is decreased by 1. After every good SACCH block, S is increased by 2 (to a maximum value of RLT). If the radio channel conditions are bad, many radio blocks will be lost, and eventually the radio link counter will expire when the value of S equals the expiry value (e.g., zero). This event is termed Radio Link Failure (RLF), and at that point the device stops using the traffic channel.

Radio link failure may be due to several factors, including rapid radio channel degradation (e.g., due to sudden co-channel interference, a UE operating near sensitivity limits, etc). In this case, the network may try to send a handover command to the UE, but the UE may not be able to decode and act on it. When a UE cannot decode the handover command, the UE may be "stuck" in the cell until radio link failure occurs. The network may not send a handover message in time to avoid radio link failure. This could be because the handover target cell is too congested to support another call. Uplink interference and/or limit-of-sensitivity (due to limited transmit power) issues may cause the radio link to fail. In this case, even if the UE can receive the downlink signaling, the network may not be able to receive UE responses, which may result in the UE being unable to handover successfully. Movement of the UE out-of-range of the base station and software or hardware failures at either the UE, base station, or both may also cause the radio link to fail.

In GSM communication cells that have an enabled call re-establishment feature (see 3GPP 24.008 Section 4.5.1.6, 3GPP 45.008 Section 6.7.2), there is a method for the UE to recover from radio link failure. In cells which do not have an enabled call re-establishment feature, radio link failure results in a call drop.

In cells where call re-establishment is enabled, a UE may be able to use a call re-establishment procedure. Successful call re-establishment allows the device to re-establish the traffic channel and to continue the call without interruption (the user does not need to manually re-dial the call and wait for the other party to answer).

In many existing network configurations (e.g., networks operating in GSM dedicated mode), the base station may be configured to maintain some or all contexts associated with the failed radio link with the UE for a period of time after detecting a radio link failure. By maintaining the various contexts, the base station may provide fast link re-establishment using those contexts should the UE request re-establishment within a pre-determined timeframe. Accordingly, by maintaining certain contexts associated with a failed radio link, the probability of dropped voice calls can be minimized and user experience can be improved.

In some cases, however, a radio link may fail due to conditions that make it extremely difficult to re-establish the link after failure. For example, if the radio link failed because the signal level between the UE and base station was too low, it may not be worthwhile to attempt to re-establish the radio link after it fails as the re-establishment attempt is likely to fail. As such, call re-establishment may occur in poor channel quality conditions, creating unnecessary signaling and re-establishment attempts for the network operators in conditions where the re-establishment is likely to fail anyway. Due to this additional processing, network operators may choose to disable call re-establishment completely to minimize network resource use. Disabling call re-establishment, however, may result in a negative user experience as it increases the likelihood of dropped calls.

Accordingly, it may be preferable for a network implementation to process call re-establishment requests, while minimizing instances of re-establishment request processing where re-establishment is likely to fail due to the conditions existing at the time of radio link failure.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
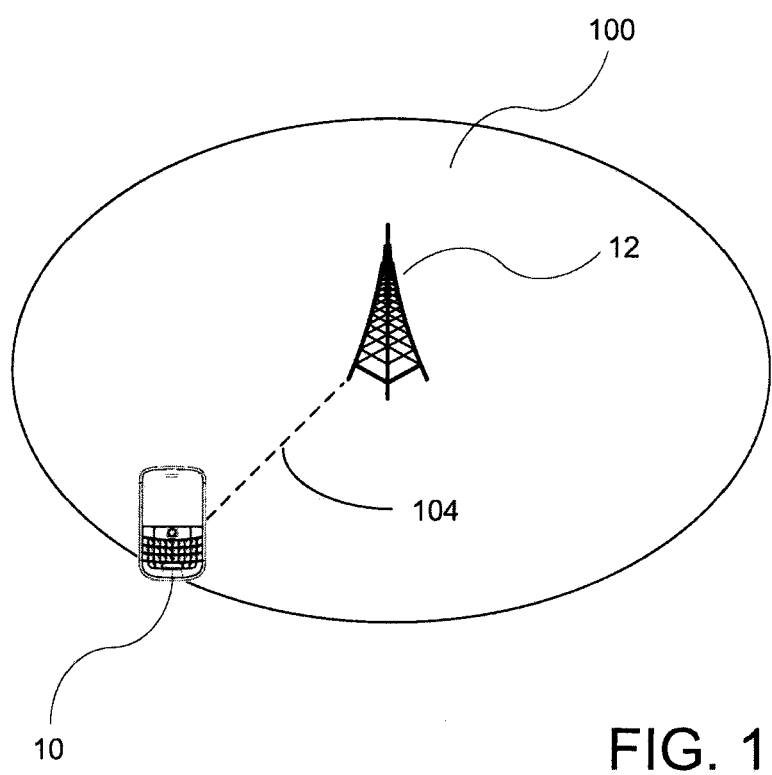
FIG. 1 is an illustration of a wireless communications network cell, wherein a base station has established a radio link with a user equipment (UE)

The present disclosure relates generally to data transmission in mobile communication systems and more specifically to an improved system and method for call re-establishment using a signal level to minimize instances of call re-establishment processing wherein the call re-establishment is likely to fail.

To this end, some embodiments include a method for implementing call re-establishment using a user equipment (UE) configured to communicate with a wireless communication network. The method includes detecting at least one of a radio link failure and a protocol failure of a connection between the UE and a serving cell, selecting a target cell of the wireless communication network, and comparing a received signal level for the target cell to a signal level threshold. The signal level threshold is greater than a minimum signal level required on the target cell. When the received signal level for the target cell exceeds the signal level threshold, the method includes initiating call re-establishment on the target cell.

Other embodiments include a method for implementing call re-establishment using a user equipment (UE) configured to communicate with a wireless communications network. The method includes comparing a received signal level of a target cell to a signal level threshold, and, when the received signal level for the target cell exceeds the signal level threshold, initiating call re-establishment on the target cell.

Other embodiments include a method for implementing call re-establishment using a user equipment (UE) configured to communicate with a wireless communications network. The method includes detecting at least one of a radio link failure and a protocol failure of a connection between the UE and a serving cell, measuring received signal levels of a broadcast control channel (BCCH) on each of a plurality of network cells, and averaging the received signal levels for each of the plurality of network cells. The method includes selecting a target cell of the wireless communication network. The target cell has the highest average received signal level out of the plurality of network cells. The method includes comparing the highest average received signal level to a signal level threshold. The signal level threshold is greater than a minimum signal level requirement on the target cell. When the received signal level for the target cell exceeds the signal level threshold, the method includes initiating call re-establishment on the target cell.

Other embodiments include a user equipment (UE) for implementing call re-establishment and configured to communicate with a wireless communication network. The UE includes a processor configured to detect at least one of a radio link failure and a protocol failure of a connection between the UE and a serving cell, select a target cell of the wireless communication network, and compare a received signal level for the target cell to a signal level threshold. The signal level threshold is greater than a minimum signal level required on the target cell. When the received signal level for the target cell exceeds the signal level threshold, the processor is configured to initiate call re-establishment on the target cell.

Other embodiments include a user equipment (UE) for implementing call re-establishment and configured to communicate with a wireless communication network. The UE includes a processor configured to detect at least one of a radio link failure and a protocol failure of a connection between the UE and a serving cell, measure received signal levels of a broadcast control channel (BCCH) on each of a plurality of network cells, average the received signal levels for each of the plurality of network cells, and select a target cell of the wireless communication network. The target cell has the highest average received signal level out of the plurality of network cells. The processor is configured to compare the highest average received signal level to a signal level threshold. The signal level threshold is greater than a minimum signal level requirement on the target cell. When the received signal level for the target cell exceeds the signal level threshold, the processor is configured to initiate call re-establishment on the target cell.

Other embodiments include a wireless communication system for implementing call re-establishment and configured to communicate with a user equipment (UE) in a network cell. The system includes a base station configured to transmit a signal level threshold. The signal level threshold is greater than a minimum signal level required on the network cell. When a received signal level for the network cell at the UE exceeds the signal level threshold, the base station is configured to receive a request to initiate call re-establishment on the network cell from the UE.

To the accomplishment of the foregoing and related ends, the disclosure, then, comprises the features hereinafter fully described. The following description and the annexed drawings set forth in detail certain illustrative aspects of the disclosure. However, these aspects are indicative of but a few of the various ways in which the principles of the disclosure can be employed. Other aspects, advantages and novel features of the disclosure will become apparent from the following detailed description of the disclosure when considered in conjunction with the drawings.

The various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Sometimes, the radio link between a UE and a base station fails. The failure may be due to degradation in path conditions between the UE and the base station (for example, changing levels of electromagnetic interference), movement of the UE out-of-range of the base station, or a software or hardware failure at either the UE, base station, or both. In many existing network configurations (e.g., networks operating in Global System for Mobile communication (GSM) dedicated mode), the base station may be configured to maintain some or all contexts associated with the failed radio link for a period of time after detecting a radio link failure. By maintaining the various contexts, the base station can provide fast call re-establishment using those contexts should the UE request re-establishment within a pre-determined timeframe. Accordingly, by maintaining certain contexts associated with a radio link failure, the probability of dropped voice calls can be minimized and user experience can be improved.

Existing call re-establishment algorithms, however, do not allow network operators to specify minimum radio channel quality criteria that must be met before a UE may initiate call re-establishment after a radio link failure. Therefore, call re-establishments may occur in poor channel quality conditions where re-establishment is inefficient and unlikely to succeed, creating unnecessary signaling/re-establishment processing overhead for the network.

The present system allows for a threshold signal level to be defined in each of a plurality of network cells. If a link failure occurs, and the signal level between the UE and base station at the time of link failure exceeded the threshold, the UE may, if any other required conditions are met, initiate call re-establishment. In contrast, if a link failure occurs and, at the time of failure, the signal level did not exceed the threshold, the UE will not initiate call re-establishment, even if other requirements are met. As such, the signal level threshold minimizes occurrences of call re-establishment requests that are issued by a UE in signal conditions where there is a high likelihood that call re-establishment will fail. Consequently, the additional processes and network overhead that would otherwise be consumed while attempting to perform call re-establishment that is likely to fail can be used to provide other services to users accessing the network.

FIG. 1 is an illustration of a wireless communications network cell 100. Within network cell 100, base station 12 establishes radio link 104 with UE 10. Base station 12 represents one or more components of a wireless communications system and may, in some cases, be referred to as a network cell. For example, references to a cell transmitting or receiving refers to some network equipment making a transmission or reception, for example a cell controller, such as a base station subsystem (BSS) which might, for example, have base station transceiver (BTS) and base station controller (BSC). In some cases, base station 12 may include an evolved universal terrestrial radio access network (E-UTRAN) node B (eNB), relay node (RN), or other network component configured to communicate with UE 10, for example. Radio link 104 may be established with UE 10 for voice communication, video communication, streaming media, or any other communication between base station 12 and UE 10 requiring a continuous data connection. As shown, UE 10 is approaching a boundary of network cell 100 supplied by base station 12. If UE 10 moves out of the cell boundary, the radio link between UE 10 and base station 12 may be broken. Similarly, even if UE 10 is within the geographic boundaries of network cell 100, but enters a region wherein the signal link is particularly weak, or if there is a software or hardware failure on either UE 10 or base station 12, the radio link may be broken.

Figure 2:
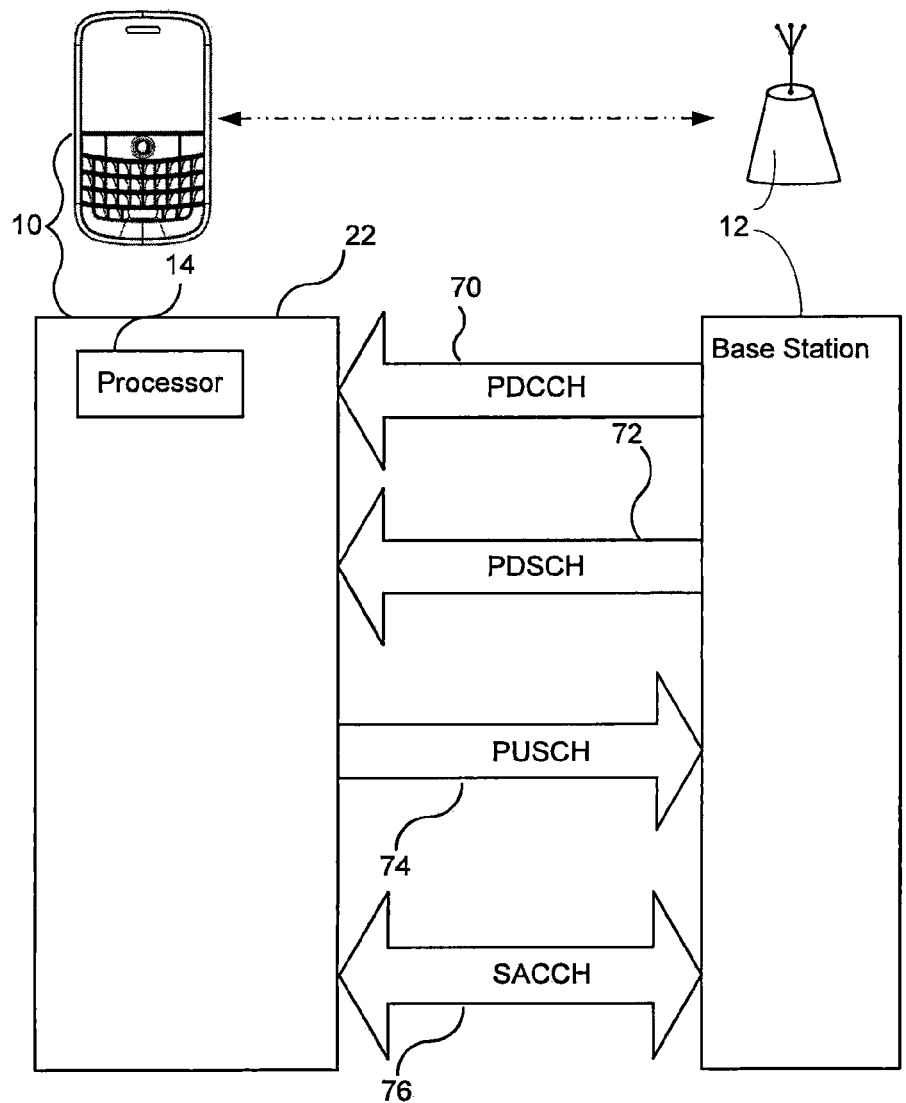
FIG. 2 is a schematic diagram illustrating the communication system including a UE and a base station shown in FIG. 1.

FIG. 2 is a schematic diagram illustrating the communication system including UE 10 and base station 12 shown in FIG. 1. UE 10 includes, among other components, a processor 14 that runs one or more software programs wherein at least one of the programs communicates with base station 12 to receive data from, and to provide data to, base station 12. When data is transmitted from UE 10 to device 12, the data is referred to as uplink data and when data is transmitted from base station 12 to UE 10, the data is referred to as downlink data. Base station 12, in one implementation, may include an eNB or other network component for communicating with UE 10 such as an RN.

To facilitate communications, a plurality of different communication channels (e.g., 70, 72, and 74) are established between base station 12 and UE 10.

Slow Associated Control Channel (SACCH) 76 is a two-way communication channel and may be used to distribute system information (SI) messages amongst a plurality of UEs 10 allowing base station 12 to provide each UE with SI of neighboring network cells. Additional exemplary channels include a broadcast control channel (BCCH), common control channel (CCCH), packet associated control channel (PACCH), and packet common control channel (PCCCH), none of which are illustrated. The BCCH may be used to broadcast system information of the cell or network. Similarly, a Fast Associated Control Channel (FACCH) (bi-directional) may be established between base station 12 and UE 10 for providing time-critical signaling associated with Traffic CHannel (TCH) (such as call setup, handover, call tear down messages) or to transmit neighbor-cell SI request messages. A FACCH is introduced in 3GPP TR 21.905. The channel block size and modulation, etc. are defined in 3GPP TS 45.003. Additional exemplary channels include the Stand-alone Dedicated Control Channel (SDCCH), a bi-directional for providing a reliable connection for signaling (usually used for initial call setup message requests before getting assigned a dedicated connection), the Common Control CHannels (CCH) including the Paging CHannel (PCH), and Random Access CHannel (RCH), the Frequency Correction CHannel (FCCH), and the Synchronization CHannel (SCH).

Returning to FIG. 1, if the radio link between UE 10 and base station 12 is broken, UE 10 may initiate a call re-establishment procedure. In the present system, UE 10 first compares the signal level of the radio link between UE 10 and base station 12 before failure against a pre-determined threshold. If the signal level exceeded the pre-determined threshold, call re-establishment may be initiated. If, however, the signal level did not exceed the threshold, UE 10 may not initiate call re-establishment. In some embodiments, the threshold is referred to as the RXLEV-MIN-CRE threshold standing for "ReceiveLevel-Minimum-CallRe-establishment." RXLEV-MIN-CRE defines a minimum receive signal level that must be met before call re-establishment may be initiated.

Generally, the threshold or RXLEV-MIN-CRE value may be communicated to one or more UE 10 using any suitable communication channel. In one implementation of the present system, for example, the threshold value is communicated to each UE 10 using an SI message transmitted using the SACCH. Base station 12 may transmit modified SYSTEM INFORMATION TYPE 21 or type21bis messages (see, for example, 3GPP 44.018 describing convention SI type 21 messages) using the SACCH to distribute SI messages for neighboring cells to each UE 10 that identify the threshold value. Multiple instances of the SI messages may be sent by base station 12, with each UE 10 using the most recently received SI message and included threshold data to replace any previously received SI message and prior threshold information.

In one implementation, the SI type 21bis message may be formatted in accordance with Table 1. As shown, the message includes a field "RX_LEV_MIN_CRE" for specifying a current threshold level for the network cell. In some cases, if a threshold is not defined in the SI message, the value of RX_LEV_MIN_CRE is set to a default value of RXLEV-ACCESS-MIN or RXLEV-MIN that contains a pre-determined minimum threshold level. In one implementation, RXLEV-ACCESS-MIN is coded as the binary representation of a minimum received signal level at UE 10 for which the UE is permitted to access the system.

TABLE 1

```
<SYSTEM INFORMATION TYPE 21bis> ::=
    < RR short PD : bit >                    -- See 3GPP TS 24.007
    < message type : bit(5) >                -- See 10.4
    < short layer 2 header : bit(2) >        -- See 3GPP TS 44.006
    < Cell Channel Description : bit (128) >
    < ARFCN : bit (10) >
    < BSIC : bit (6) >
    { 0 | 1 < RX_LEV_MIN_CRE : bit (6) }
    <spare padding>;
```

Generally, SI Type 21bis messages only include information about neighbor cells. Accordingly, to reduce the probability that UE 10 has no information about the RXLEV-MIN-CRE value for the currently serving cell, UE 10 may be configured to store a history of previously visited cells and the SI messages received in each of those cells. During a circuit switched (CS) call with an established connection to base station 12, for example, UE 10 stores a list of cell ID, RXLEV-MIN-CRE value-pairs received for neighbor cells. After storing the RXLEV-MIN-CRE values for a neighboring cell, the information may be considered valid until a new RXLEV-MIN-CRE value is received for that cell. As such, after the first successful handover from a first network cell to a second neighbor network cell, UE 10 has acquired information about the second and current serving network cell because, previously, the second network cell was a neighbor network cell for UE 10. In this manner, UE 10 can build-up a list of RXLEV-MIN-CRE values for many network cells including the current serving cell and surrounding neighbor cells.

In some circumstances, however, UE 10 has not received a RXLEV-MIN-CRE value for the current network cell. In that case, UE 10 may be configured to implement one of the following options: First, call re-establishment may be temporarily disallowed on the cell for which there is no known RXLEV-MIN-CRE value. Second, a value of RXLEV-MIN may be used as a default value. On a particular network cell, RXLEV-MIN generally defines a minimum signal level that must be met within a particular network cell before a UE can initiate communication with the network cell. Third, the RXLEV-MIN-CRE values of one or more neighbor cells may be averaged and used within the presently serving network cell.

Depending upon the system implementation, the stored list of cell ID/RXLEV-MIN-CRE value-pairs may be deleted after a call is terminated (e.g., after call re-establishment has failed or the call was terminated by the user). Alternatively, the values may be stored for future use as it may be likely that the RXLEV-MIN-CRE values will not change very often, if at all, for a given network cell.

In one implementation, the RXLEV-MIN-CRE measured signal level values are mapped to an RXLEV-MIN-CRE 5-bit value between 0 and 31, as follows:

$RXLEV0$ = less than −110 dBm $RXLEV1$ = −110 dBm to −108 dBm $RXLEV2$ = −108 dBm to −106 dBm

...

$RXLEV30$ = −50 dBm −48 dBm $RXLEV31$ = greater than −48 dBm

Alternatively, the RXLEV-MIN-CRE may be coded as an offset value relative to RXLEV-MIN. The step size of the RXLEV-MIN-CRE values may be adjusted, and start/end values for any RXLEV-MIN-CRE offset value can be modified.

Signaling of the RXLEV-MIN-CRE using SI type 21bis message may be considered to implicitly indicate network support for call re-establishment of radio link and protocol failures.

Alternatively, the threshold value (e.g., RXLEV-MIN-CRE) may be signaled for any given network cell using information elements (IEs) transferred from base station 12 to UE 10 (see, for example, 3GPP 45.008 for descriptions of conventional information elements). The information elements may be communicated by means of a point-to-point transmission (for example, on SACCH during the call, as discussed above), or by means of broadcast transmissions (e.g. on the BCCH channel, or as a distribution message on PACCH). In one implementation, the information is encoded within a Call Re-establishment Control information element that provides parameters (i.e., the threshold) used to control the re-establishment of calls. The information element may be broadcast to UEs in SYSTEM INFORMATION TYPE 3 messages, for example. In at least one specific implementation, the information element is a type 3 information element with 1 octet length as specified by 3GPP 24.007 subsection 12.2.1.1.4. The information element may be encoded as illustrated in Table 2

TABLE 2

| 8 | 7 | 6 | 5 | 4 | 3 | 2 | 1 | |
|---|---|---|---|---|---|---|---|---|
| CRE | | RXLEV-MIN-CRE | | | | | | octet 1 |

As shown in Table 2, the call re-establishment information element includes a call re-establishment (CRE) indication, and a threshold (RXLEV-MIN-CRE). As such, the information element may specify certain conditions in which call re-establishment is permitted, in addition to a particular signal level threshold that must be met before a UE initiates call re-establishment. The CRE indication includes bits 8 to 7 of the information element and can take several values. For example, a value of '0 0' may indicate call re-establishment is not supported, or the value is not defined. A value of '0 1' may indicate call re-establishment is supported only for radio link failures. A value of '1 0' may indicate call re-establishment is supported only for protocol failures. A value of '1 1' may indicate call re-establishment is supported for both radio link and protocol failures.

Within the information element, RXLEV-MIN-CRE indicates a minimum receive signal level threshold that must be met at the time call re-establishment is requested. The threshold is defined in bits 6 to 1 of the information element and may be encoded as a binary representation of the minimum received signal level. As such, RXLEV-MIN-CRE may have a range from 0 to 63, with the values of 0 to 63 representing various threshold signal levels.

In other embodiments, however, the signal level threshold and any other conditions that must be met before call re-establishment can be initiated are defined using any appropriate data structure and communicated to the UE using any suitable communication channel. Alternatively, the signal level threshold and any other conditions may be set on a particular UE using a user interface of the UE, or may be specified at the time of manufacturing the UE, or via firmware or software updates for the UE.

Figure 3:
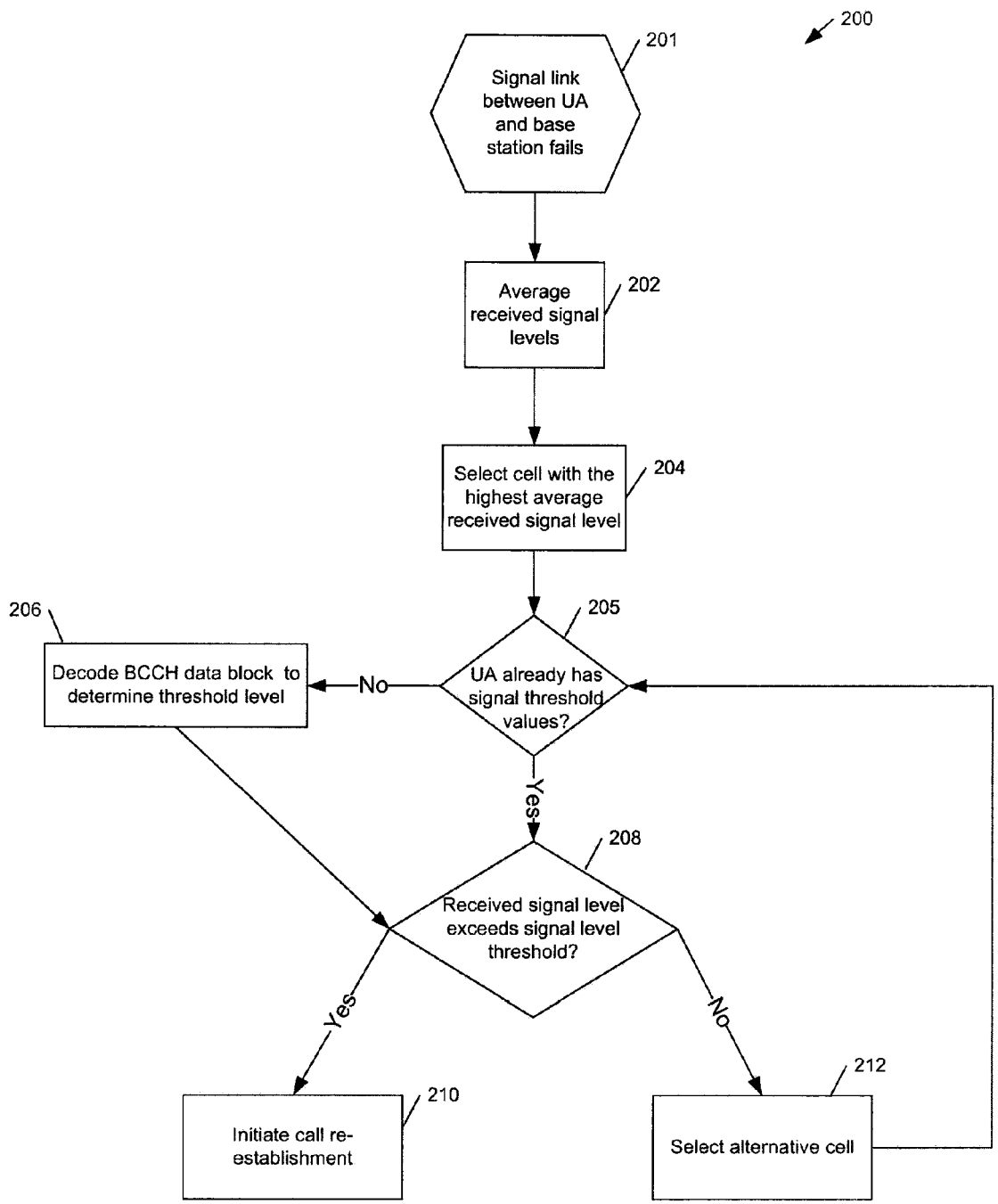
FIG. 3 is a flowchart illustrating an example method for using a signal level threshold to determine whether to initiate call re-establishment.

FIG. 3 is a flowchart illustrating example method 200 for using the present signal level threshold (e.g., RXLEV-MIN-CRE) to determine whether to initiate call re-establishment. In the event of a radio link failure or after an abnormal radio resource (RR) connection release of an active radio link, call re-establishment may be attempted. The method illustrated in FIG. 3 allows a UE to determine whether to initiate call re-establishment and, if so, which cell to use for the call re-establishment attempt.

Prior to method 200, UE 10 has established a connection with a serving cell allowing for communication between UE 10 and base station 12 of a serving cell. UE 10 may have also stored signal level threshold information for a plurality of cells, including the present serving cell and various neighbor cells. In an alternative implementation, individual threshold values may be specified for each of a plurality of carriers operating on a cell. In step 201, the connection between UE 10 and base station 12 fails. There may be many reasons for the loss of connection, including radio link failure and protocol failure.

In step 202, received signal level measurement samples are averaged for each of a plurality of cells (e.g., neighbor cells) including the serving cell. In one implementation, the samples measure the received signal levels for the BCCH carriers of each of the cells indicated in the BCCH allocation list (BA) (e.g., via the SACCH) received on the serving cell and are limited to signals received in a certain time period, such as the last five seconds. In alternative embodiments, however, the signal level measurements may be made of any combination of available carriers or communication channels between UE 10 and one or more network cells. After averaging the values for each of the cells in step 202, the cell providing the BCCH carrier with the highest average received signal level with a permitted network color code (NCC) is selected as the first target cell for call re-establishment in step 204.

In step 205, the system evaluates whether the UE has available threshold information for the selected cell. In step 206, if necessary (e.g., the UE does not have stored valid threshold parameters for the cell selected in step 202), the UE may attempt to decode the BCCH data block containing parameters affecting cell selection (e.g., signal level threshold values such as RXLEV-MIN-CRE). For example, if the UE's serving cell provides the highest average received signal level, the UE may attempt to decode the BCCH on the serving cell. A similar process may apply if one of the neighbor cells provides a higher received signal strength. However, if the neighbor cell information is signaled using SI type21bis, as discussed above, if the necessary information for camping (e.g., selecting a suitable cell for the purpose of receiving normal service—see 3GPP 43.022 subsection 3.2) on the cell is available, it may not be necessary to decode the BCCH, possibly saving time for call re-establishment. In that case, step 206 may be skipped.

If the selected cell is suitable (e.g., as specified by 3GPP TS 43.022), call re-establishment may be allowed on that network cell. If so, the received signal level at the UE for that cell is compared to the threshold level for call re-establishment in that cell in step 208. If the received signal level is greater than the defined threshold (e.g., if the received signal level is higher than RXLEV-MIN-CRE), call re-establishment may be attempted on the selected cell in step 210 by the UE. If, however, the threshold level is not met, UE 10 may select an alternative cell in step 212 and use that cell to determine whether call re-establishment may be initiated.

In addition to specifying a signal threshold value, each network cell may define additional rules that limit the circumstances in which call re-establishment is allowed. For example, call re-establishment may only be eligible for certain categories of connection failures, or particular error codes for a type of connection failure. For example, call re-establishment may only be allowed in the case of protocol failures having particular cause values (see below for additional information), or for radio link failures. In that case, in step 208, the system verifies that both the signal level exceeds the signal level threshold, and that any additional rules have been satisfied before proceeding with call re-establishment.

If the call to be re-established is an emergency call, the threshold for the minimum allowed received signal level at the UE for call re-establishment and any additional rules may be ignored (e.g., if the received signal level at the UE is lower than the threshold value for the call re-establishment, then the UE may still initiate re-establishment and the RXLEV-MIN-CRE value will be ignored). In that case, the UE may use steps 202-204 and 210, without executing step 208 to select a cell and to initiate call re-establishment. As such, the emergency call may be re-established on the cell having the highest average signal level as before notwithstanding the actual signal level on that cell.

In step 212, if the UE is unable to decode the BCCH data block or if the conditions in step 208 are not met, the cell providing the next highest average received signal level with a permitted NCC may be selected, and the UE may move to step 205 to determine whether to initiate a call re-establishment process on the newly selected cell.

If the call re-establishment has been attempted and failed on a pre-determined number of network cells (e.g., 6) with the strongest average received signal level values with a permitted NCC, the call re-establishment attempt may be abandoned. After abandonment, the UE may return to idle mode and camp as quickly as possible on the cell whose channel has just been released.

Using the method of FIG. 3, the UE may not access a cell to attempt call re-establishment later than a given time duration (e.g., 20 seconds) after the detection within the UE of the radio link or protocol failure responsible for the call re-establishment attempt. If the time period has elapsed without a successful call re-establishment, the call re-establishment attempt may be abandoned. After abandonment, the UE may return to idle mode and camp as quickly as possible on the cell whose channel has just been released.

Figures 4, 5:
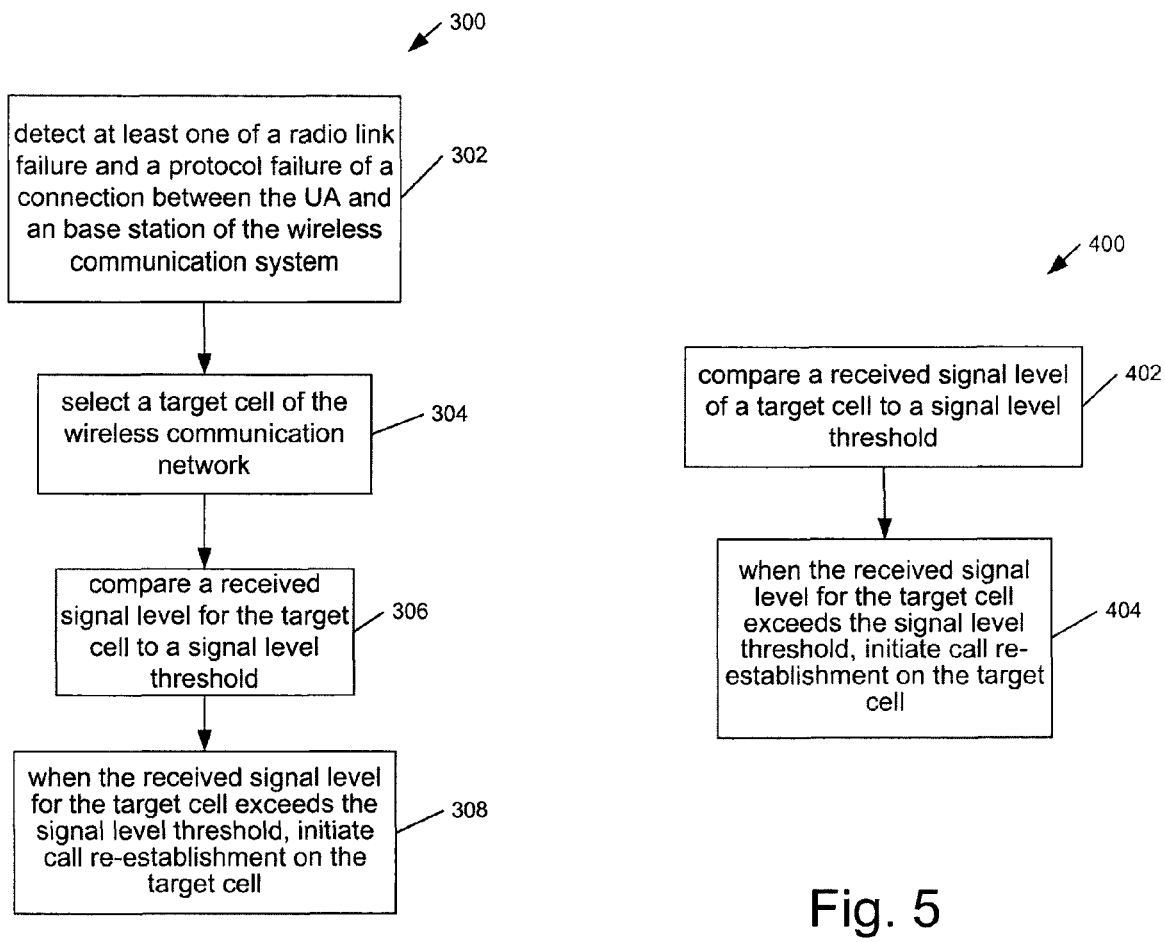
FIG. 4 is a flowchart illustrating a second example method for using a signal level threshold to determine whether to initiate call re-establishment.
FIG. 5 is a flowchart illustrating a third example method for using a signal level threshold to determine whether to initiate call re-establishment.

FIG. 4 is a flowchart illustrating example method 300 for using the present signal level threshold (e.g., RXLEV-MIN-CRE) to determine whether to initiate call re-establishment.

In step 302 the system detects at least one of a radio link failure and a protocol failure of a connection between the UE and a base station of the wireless communication system. In step 304, the system selects a target cell of the wireless communication network. In step 306, the system compares a received signal level for the target cell to a signal level threshold. When the received signal level for the target cell exceeds the signal level threshold, the system initiates call re-establishment on the target cell in step 308.

FIG. 5 is a flowchart illustrating example method 400 for using the present signal level threshold (e.g., RXLEV-MIN-CRE) to determine whether to initiate call re-establishment. In step 402, the system compares a received signal level of a target cell to a signal level threshold. In step 404, when the received signal level for the target cell exceeds the signal level threshold, the system initiates call re-establishment on the target cell.

In some embodiments, a minimum signal level threshold may be defined before call re-establishment can be initiated by a UE after link failure. In some cases, however, the threshold level is combined with additional rules to further limit the circumstances in which the UE can request call re-establishment. For example, re-establishment may only be allowed after a radio link failure, or a protocol failure. Alternatively, call re-establishment may be enabled if the signal level threshold is met and one or more of the protocol failure cause values shown in Table 3 is detected:

TABLE 3

3GPP 44.018, Annex F (informative)

Cause value = 0 Normal event;
indicates that the channel is released because of a normal event or that an assignment or handover is successfully, and normally, completed.
Cause value = 1 Abnormal release, unspecified;
indicates that the channel is released because of an abnormal event without specifying further reasons.
Cause value = 2 Abnormal release, channel unacceptable;
indicates that the channel type or channel characteristics are not acceptable.
Cause value = 3 Abnormal release, timer expired;
indicates that the release is caused by a timer expiry.
Cause value = 4 Abnormal release, no activity on the radio path;
indicates that some supervisory function has detected that the channel is not active.
Cause value = 5 Pre-emptive release;
indicates that the channel is released in order to be allocated to a call with priority (e.g. an emergency call).
Cause value = 6 UTRAN configuration unknown;
indicates that the MS does not know the UTRAN predefined configuration (i.e. was not read from UTRAN Channels) or that the MS does not have the capability to handle the requested default configuration.
Cause value = 8 Handover impossible, timing advance out of range;
indicates that a handover is unsuccessful because the target BTS is beyond the normal range and the target BTS would not accept an out of range timing advance.
Cause value = 9 Channel mode unacceptable
indicates that the MS does not have the capability to handle the requested mode or type of channel.
Cause value = 10 Frequency not implemented
indicates that the MS does not have the capability to operate on (at least one of) the requested frequency(ies).
Cause value = 11 Originator or talker leaving group call area
indicates that VGCS uplink or VBS call is released because the mobile talking is outside the group call area
Cause value = 12 Lower layer failure
indicates that a lower layer failed to establish a connection on the new channel.
Cause value = 65 Call already cleared;
indicates that a handover is unsuccessful because the connection has been released by the network or the remote user.
Cause value = 95 Semantically incorrect message;
See annex H, sub-clause H5.10.
Cause value = 96 Invalid mandatory information;
See annex H, sub-clause H6.1.

TABLE 3-continued

3GPP 44.018, Annex F (informative)

Cause value = 97 Message type non-existent or not implemented;
See annex H, sub-clause H6.2.
Cause value = 98 Message type not compatible with protocol state;
See annex H, sub-clause H6.3
Cause value = 100 Conditional IE error;
See annex H, sub-clause H6.5
Cause value = 101 No cell allocation available;
indicates that an assignment or handover is unsuccessful because the MS has no current CA.
Cause value = 111 Protocol error unspecified;
See annex H, sub-clause H6.8.

After a radio link failure, the base station or one or more other network components may be configured to implement a timer to delay channel deactivation in case the UE initiates call re-establishment. The delay can be of any appropriate duration, however, in some implementations, the delay is continually adjusted based upon the signal link level between the base station and the UE. As the signal level increases, the delay increases because the likelihood that the UE will initiate call re-establishment is also increased. Conversely, as the signal level decreases, the delay may also be decreased as it is unlikely that the UE will initiate call re-establishment.

In at least one specific implementation of the network of the present system, the network initiates a channel release by sending a CHANNEL RELEASE message to the UE using the main DCCH, starting a timer T3109 and deactivating the SACCH.

On receipt of a CHANNEL RELEASE message, the UE starts a timer T3110 and disconnects the main signaling link. When timer T3110 times out, or when the disconnection is confirmed, the UE deactivates all channels, considers the RR connection as released, and returns to CCCH idle mode, returns to PCCCH or CCCH packet idle mode or enters packet transfer mode.

In accordance with some embodiments, upper layers of the network may decide on a call re-establishment (see 3GPP TS 24.008). Data Links other than the main signaling link may be disconnected by local end link release. In the case of dedicated mode, on the network side, when the main signaling link is disconnected, the network stops timer T3109 and starts a timer T3111. When timer T3111 times out, the network deactivates the channels, and the channels are then free to be allocated to another connection. The sole purpose of timer T3111 is to allow some time to acknowledge the disconnection and to protect the channel in case of loss of the acknowledge frame. If timer T3109 times out, the network deactivates the channels, and the channels are then free to be allocated to another connection. The network should maintain for a while the transaction context in order to allow call re-establishment.

The CHANNEL RELEASE message may include an RR cause indication as follows: #0: if it is a normal release, e.g. at the end of a call or at normal release of a DCCH. #1: to indicate an unspecified abnormal release. #2, #3 or #4: to indicate a specific release event. #5: if the channel is to be assigned for servicing a higher priority call (e.g. an emergency call). #65: if e.g. a handover procedure is stopped because the call has been cleared.

The CHANNEL RELEASE message may include the information element BA Range which may be used by a UE in its selection algorithm (see 3GPP TS 45.008 and 3GPP TS 23.022).

UEs not supporting voice group call service (VGCS) or voice broadcast service (VBS) listening may consider Group Channel Description and Group Cipher Key Number information elements as unnecessary in the message and perform the channel release procedure as normal.

For UEs supporting VGCS listening, the following procedures may apply: The CHANNEL RELEASE message may include the information element Group Channel Description. In that case, the UE may release the layer 2 link, enter the group receive mode and give an indication to the upper layer. If a CHANNEL RELEASE message with no Group Channel Description is received, the normal behavior applies.

If ciphering is applied on the VGCS or VBS channel, the network may provide in the CHANNEL RELEASE message with the Group Cipher Key Number information element for the group cipher key to be used by the UE for reception of the VGCS or VBS channel. If this information element is not included, no ciphering is applied on the VGCS or VBS channel.

A UE not supporting the "GPRS" option may consider the GPRS Resumption information element as an information element unknown in the CHANNEL RELEASE message and perform the RR connection release procedure as normal.

For a UE supporting the "GPRS" option, the following additional procedures also apply: The CHANNEL RELEASE message may include the information element GPRS Resumption. If the GPRS Resumption information element indicates that the network has resumed GPRS services, the RR sublayer of the UE may indicate a RR GPRS resumption complete to the MM sublayer, see clause 4. If the GPRS Resumption information element indicates that the network has not successfully resumed GPRS services, the RR sublayer of the UE may indicate a RR GPRS resumption failure to the MM sublayer, see clause 4. If the UE has performed the GPRS suspension procedure (clause 3.3.1.1.4.2) and the GPRS Resumption information element is not included in the message, the RR sublayer of the UE may indicate a RR GPRS resumption failure to the MM sublayer, see clause 4. If the UE has not performed the GPRS suspension procedure and the GPRS Resumption information element is not included in the message, the UE may perform the RR connection release procedure as normal.

A signal level threshold (e.g., RXLEV-MIN-CRE) is defined to allow a network to specify a minimum required received signal level that must be met before call re-establishment can be initiated by a UE. Furthermore, call re-establishment may be triggered following an abnormal radio resource (RR) connection release due to a protocol failure.

Figure 6:
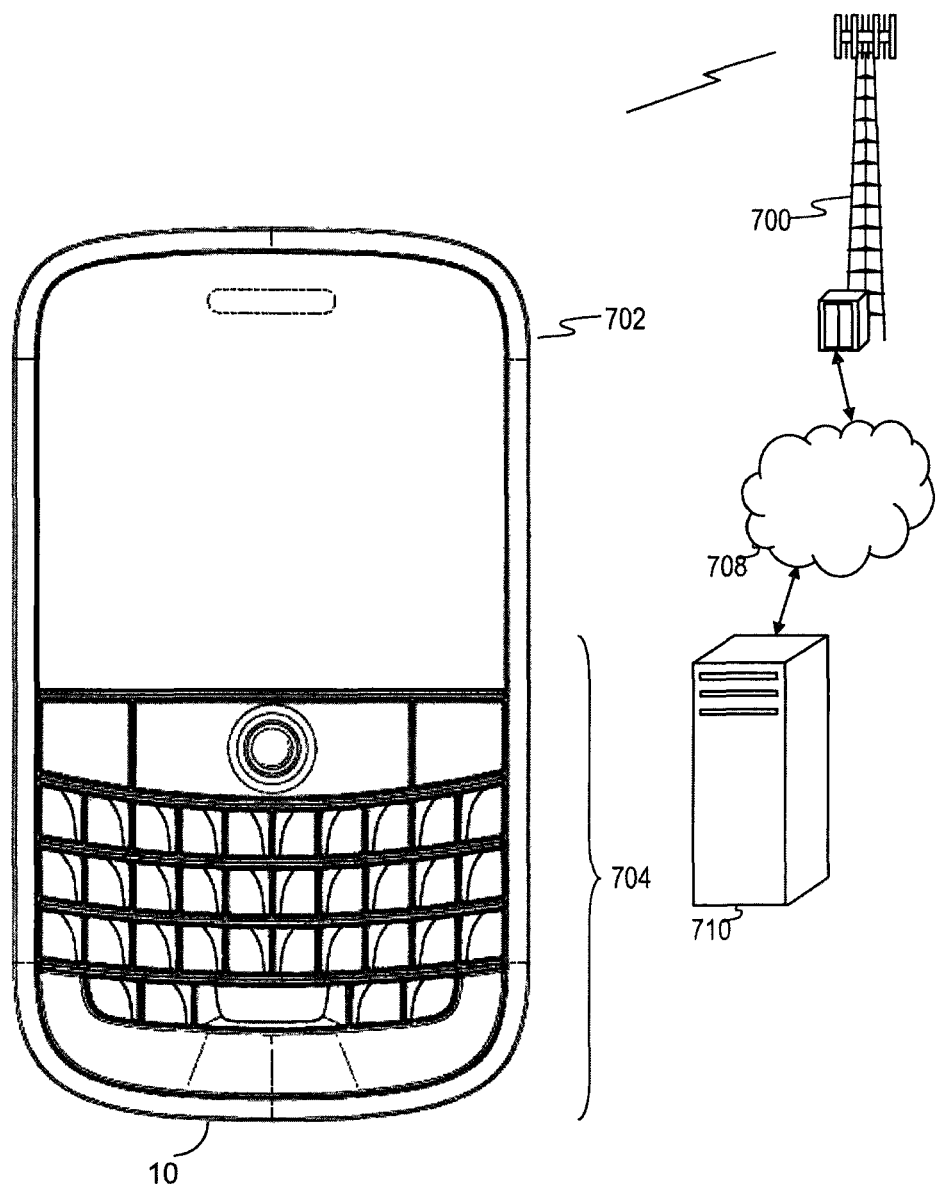
FIG. 6 is a diagram of a wireless communications system including a UE operable for some of the various embodiments of the disclosure.

FIG. 6 illustrates a wireless communications system including an embodiment of UE 10. UE 10 is operable for implementing aspects of the disclosure, but the disclosure should not be limited to these implementations. Though illustrated as a mobile phone, the UE 10 may take various forms including a wireless handset, a pager, a personal digital assistant (PDA), a portable computer, a tablet computer, a laptop computer. Many suitable devices combine some or all of these functions. In some embodiments of the disclosure, the UE 10 is not a general purpose computing device like a portable, laptop or tablet computer, but rather is a special-purpose communications device such as a mobile phone, a wireless handset, a pager, a PDA, or a telecommunications device installed in a vehicle. The UE 10 may also be a device, include a device, or be included in a device that has similar capabilities but that is not transportable, such as a desktop computer, a set-top box, or a network node. The UE 10 may support specialized activities such as gaming, inventory control, job control, and/or task management functions, and so on.

The UE 10 includes a display 702. The UE 10 also includes a touch-sensitive surface, a keyboard or other input keys generally referred as 704 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 10 may present options for the user to select, controls for the user to actuate, and/or cursors or other indicators for the user to direct.

The UE 10 may further accept data entry from the user, including numbers to dial or various parameter values for configuring the operation of the UE 10. The UE 10 may further execute one or more software or firmware applications in response to user commands. These applications may configure the UE 10 to perform various customized functions in response to user interaction. Additionally, the UE 10 may be programmed and/or configured over-the-air, for example from a wireless base station, a wireless access point, or a peer UE 10.

Among the various applications executable by the UE 10 are a web browser, which enables the display 702 to show a web page. The web page may be obtained via wireless communications with a wireless network access node, a cell tower, a peer UE 10, or any other wireless communication network or system 700. The network 700 is coupled to a wired network 708, such as the Internet. Via the wireless link and the wired network, the UE 10 has access to information on various servers, such as a server 710. The server 710 may provide content that may be shown on the display 702. Alternately, the UE 10 may access the network 700 through a peer UE 10 acting as an intermediary, in a relay type or hop type of connection.

Figure 7:
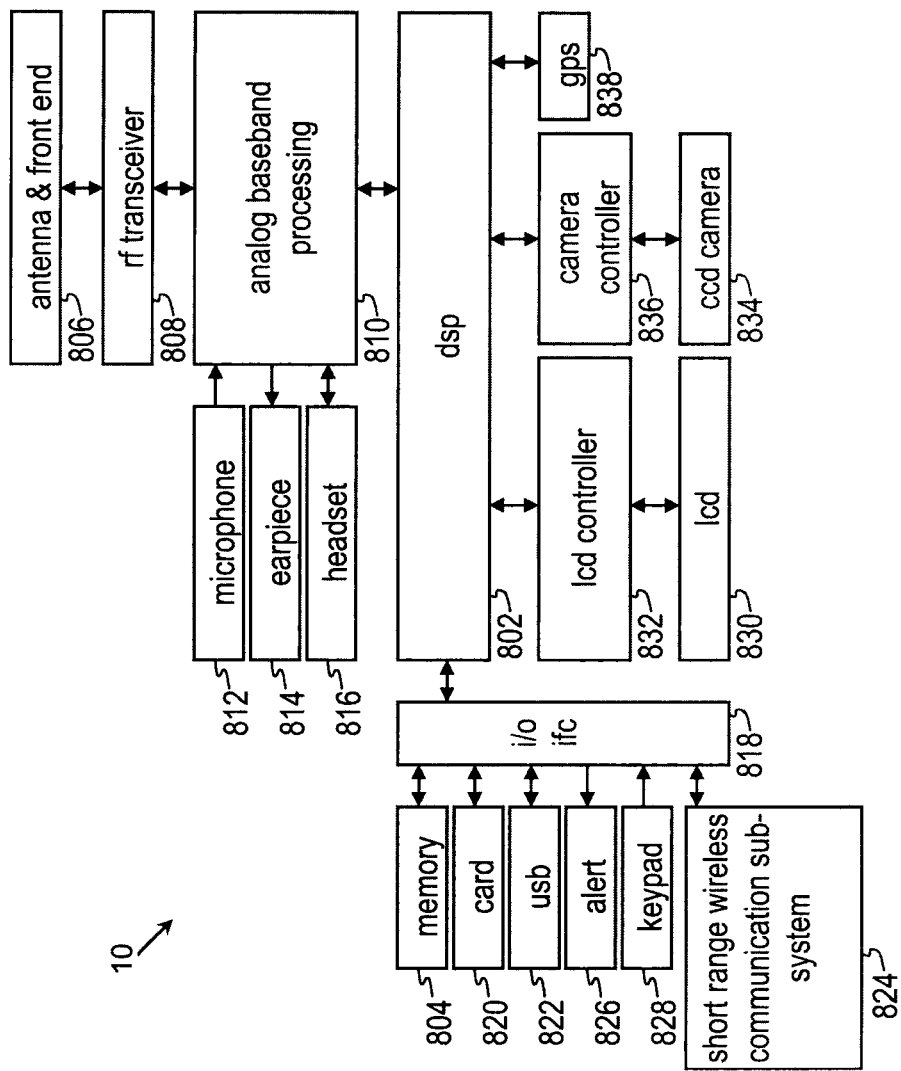
FIG. 7 is a block diagram of a UE operable for some of the various embodiments of the disclosure.

FIG. 7 shows a block diagram of the UE 10. While a variety of known components of UEs 110 are depicted, in an embodiment a subset of the listed components and/or additional components not listed may be included in the UE 10. The UE 10 includes a digital signal processor (DSP) 802 and a memory 804. As shown, the UE 10 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, an LCD controller 832, a charge-coupled device (CCD) camera 834, a camera controller 836, and a global positioning system (GPS) sensor 838. In an embodiment, the UE 10 may include another kind of display that does not provide a touch sensitive screen. In an embodiment, the DSP 802 may communicate directly with the memory 804 without passing through the input/output interface 818.

The DSP 802 or some other form of controller or central processing unit operates to control the various components of the UE 10 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the UE 10 to send and receive information from a cellular network or some other available wireless communications network or from a peer UE 10. In an embodiment, the antenna and front end unit 806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 806 may include antenna tuning and/or impedance matching components, RF power amplifiers, and/or low noise amplifiers.

The RF transceiver 808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF Transceiver 808, portions of the Antenna and Front End 806, and the analog baseband processing unit 810 may be combined in one or more processing units and/or application specific integrated circuits (ASICs).

The analog baseband processing unit 810 may provide various analog processing of inputs and outputs, for example analog processing of inputs from the microphone 812 and the headset 816 and outputs to the earpiece 814 and the headset 816. To that end, the analog baseband processing unit 810 may have ports for connecting to the built-in microphone 812 and the earpiece speaker 814 that enable the UE 10 to be used as a cell phone. The analog baseband processing unit 810 may further include a port for connecting to a headset or other hands-free microphone and speaker configuration. The analog baseband processing unit 810 may provide digital-to-analog conversion in one signal direction and analog-to-digital conversion in the opposing signal direction. In some embodiments, at least some of the functionality of the analog baseband processing unit 810 may be provided by digital processing components, for example by the DSP 802 or by other central processing units.

The DSP 802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 802 may perform modulation, coding, interleaving, and spreading, and for a receiver function the DSP 802 may perform despreading, deinterleaving, decoding, and demodulation. In another embodiment, for example in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In other wireless technology applications, yet other signal processing functions and combinations of signal processing functions may be performed by the DSP 802.

The DSP 802 may communicate with a wireless network via the analog baseband processing unit 810. In some embodiments, the communication may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB interface 822 and the short range wireless communication sub-system 824. The USB interface 822 may be used to charge the UE 10 and may also enable the UE 10 to function as a peripheral device to exchange information with a personal computer or other computer system. The short range wireless communication sub-system 824 may include an infrared port, a Bluetooth interface, an IEEE 802.11 compliant wireless interface, or any other short range wireless communication sub-system, which may enable the UE 10 to communicate wirelessly with other nearby mobile devices and/or wireless base stations.

The input/output interface 818 may further connect the DSP 802 to the alert 826 that, when triggered, causes the UE 10 to provide a notice to the user, for example, by ringing, playing a melody, or vibrating. The alert 826 may serve as a mechanism for alerting the user to any of various events such as an incoming call, a new text message, and an appointment reminder by silently vibrating, or by playing a specific pre-assigned melody for a particular caller.

The keypad 828 couples to the DSP 802 via the interface 818 to provide one mechanism for the user to make selections, enter information, and otherwise provide input to the UE 10. The keyboard 828 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 830, which may include touch screen capability and also display text and/or graphics to the user. The LCD controller 832 couples the DSP 802 to the LCD 830.

The CCD camera 834, if equipped, enables the UE 10 to take digital pictures. The DSP 802 communicates with the CCD camera 834 via the camera controller 836. In another embodiment, a camera operating according to a technology other than Charge Coupled Device cameras may be employed. The GPS sensor 838 is coupled to the DSP 802 to decode global positioning system signals, thereby enabling the UE 10 to determine its position. Various other peripherals may also be included to provide additional functions, e.g., radio and television reception.

Figure 8:
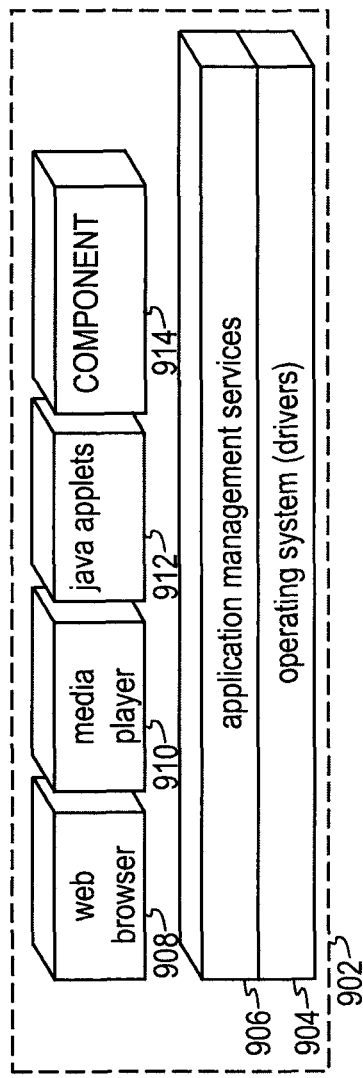
FIG. 8 is a diagram of a software environment that may be implemented on a UE operable for some of the various embodiments of the disclosure.

FIG. 8 illustrates a software environment 902 that may be implemented by the DSP 802. The DSP 802 executes operating system drivers 904 that provide a platform from which the rest of the software operates. The operating system drivers 904 provide drivers for the UE hardware with standardized interfaces that are accessible to application software. The operating system drivers 904 include application management services ("AMS") 906 that transfer control between applications running on the UE 10. Also shown in FIG. 8 are a web browser application 908, a media player application 910, and Java applets 912. The web browser application 908 configures the UE 10 to operate as a web browser, allowing a user to enter information into forms and select links to retrieve and view web pages. The media player application 910 configures the UE 10 to retrieve and play audio or audio-visual media. The Java applets 912 configure the UE 10 to provide games, utilities, and other functionality. A component 914 might provide functionality described herein.

Figure 9:
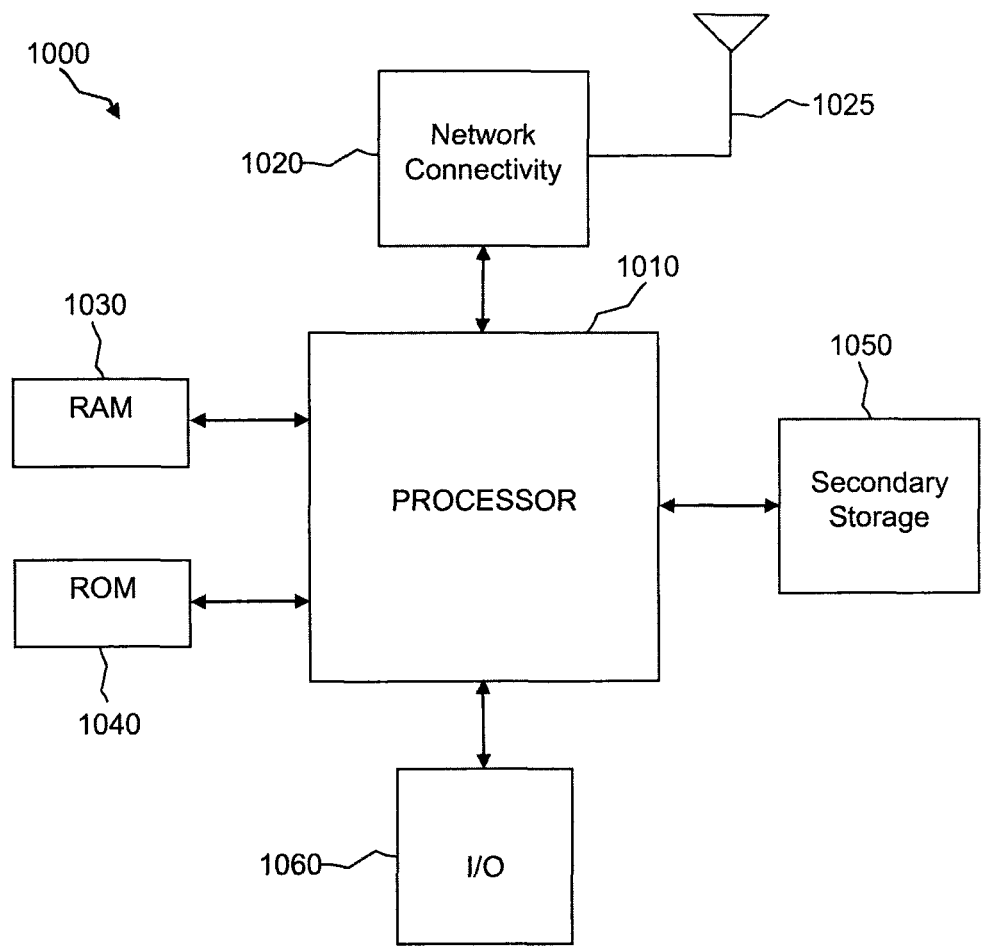
FIG. 9 is an illustrative general purpose computer system suitable for some of the various embodiments of the disclosure.

The UE 10, base station 12, and other components described above might include a processing component that is capable of executing instructions related to the actions described above. FIG. 9 illustrates an example of a system 1000 that includes a processing component 1010 suitable for implementing one or more embodiments disclosed herein. In addition to the processor 1010 (which may be referred to as a central processor unit (CPU or DSP), the system 1000 might include network connectivity devices 1020, random access memory (RAM) 1030, read only memory (ROM) 1040, secondary storage 1050, and input/output (I/O) devices 1060. In some embodiments, a program for implementing the determination of a minimum number of HARQ process IDs may be stored in ROM 1040. In some cases, some of these components may not be present or may be combined in various combinations with one another or with other components not shown. These components might be located in a single physical entity or in more than one physical entity. Any actions described herein as being taken by the processor 1010 might be taken by the processor 1010 alone or by the processor 1010 in conjunction with one or more components shown or not shown in the drawing.

The processor 1010 executes instructions, codes, computer programs, or scripts that it might access from the network connectivity devices 1020, RAM 1030, ROM 1040, or secondary storage 1050 (which might include various disk-based systems such as hard disk, floppy disk, or optical disk). While only one processor 1010 is shown, multiple processors may be present. Thus, while instructions may be discussed as being executed by a processor, the instructions may be executed simultaneously, serially, or otherwise by one or multiple processors. The processor 1010 may be implemented as one or more CPU chips.

The network connectivity devices 1020 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1020 may enable the processor 1010 to communicate with the Internet or one or more telecommunications networks or other networks from which the processor 1010 might receive information or to which the processor 1010 might output information.

The network connectivity devices 1020 might also include one or more transceiver components 1025 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1025 might include separate receiving and transmitting units or a single transceiver. Information transmitted or received by the transceiver 1025 may include data that has been processed by the processor 1010 or instructions that are to be executed by processor 1010. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embodied in the carrier wave, or other types of signals currently used or hereafter developed may be referred to as the transmission medium and may be generated according to several methods well known to one skilled in the art.

The RAM 1030 might be used to store volatile data and perhaps to store instructions that are executed by the processor 1010. The ROM 1040 is a non-volatile memory device that typically has a smaller memory capacity than the memory capacity of the secondary storage 1050. ROM 1040 might be used to store instructions and perhaps data that are read during execution of the instructions. Access to both RAM 1030 and ROM 1040 is typically faster than to secondary storage 1050. The secondary storage 1050 is typically comprised of one or more disk drives or tape drives and might be used for non-volatile storage of data or as an over-flow data storage device if RAM 1030 is not large enough to hold all working data. Secondary storage 1050 may be used to store programs that are loaded into RAM 1030 when such programs are selected for execution.

The I/O devices 1060 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1025 might be considered to be a component of the I/O devices 1060 instead of or in addition to being a component of the network connectivity devices 1020. Some or all of the I/O devices 1060 may be substantially similar to various components depicted in the previously described drawing of the UE 10, such as the display 702 and the input 704.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

To apprise the public of the scope of this disclosure, the following claims are made:

The invention claimed is:

1. A method for implementing call re-establishment using a user equipment (UE) configured to communicate with a wireless communication network, comprising:

determining a signal level between the UE and a serving cell;
receiving signal level threshold values for two or more neighbor cells; and
averaging the signal level threshold values of each of the two or more neighbor cells to determine a call re-establishment signal level threshold;
detecting at least one of a radio link failure and a protocol failure of a connection between the UE and the serving cell;
comparing the signal level between the UE and the serving cell to a the call re-establishment signal level threshold defining a minimum receive signal level that must be met before call re-establishment may be initiated;
when the signal level between the UE and the serving cell exceeds the call re-establishment signal level threshold, initiating call re-establishment by:
selecting a target cell of the wireless communication network, the target cell being a neighbor cell of the serving cell,
comparing a received signal level for the target cell to a signal level threshold of the target cell, wherein the signal level threshold of the target cell is greater than the call re-establishment signal level threshold, and
when the received signal level for the target cell exceeds the signal level threshold of the target cell, initiating call re-establishment on the target cell; and
when the signal level between the UE and the serving cell does not exceed the call re-establishment signal level threshold, not initiating call re-establishment on the target cell.

2. The method of claim 1, wherein the call re-establishment signal level threshold is encoded within a system information type 21bis message.

3. The method of claim 1, wherein the call re-establishment signal level threshold is encoded within a system information element.

4. The method of claim 3, wherein the information element indicates whether call re-establishment can be initiated in the event of at least one of a radio link failure and a protocol failure.

5. The method of claim 1, wherein the protocol failure includes an error condition selected from the group consisting of abnormal release—unspecified, abnormal release—channel unacceptable, abnormal release—timer expired, abnormal release—no activity on the radio path, lower layer failure, protocol error—unspecified, handover impossible—timing advance out of range, and call already cleared.

6. The method of claim 1, including, when the connection between the UE and the serving cell is for an emergency communication, initiating call re-establishment on the target cell regardless of the received signal level for the target cell.

7. The method of claim 1, including, when the call re-establishment signal level threshold is not defined, not initiating call re-establishment on the target cell.

8. The method of claim 1, including assigning the call re-establishment signal level threshold a default value.

9. A method for implementing call re-establishment using a user equipment (UE) configured to communicate with a wireless communications network, comprising:
determining a signal level between the UE and a serving cell;
wherein the signal level is a signal power level;
receiving signal level threshold values for two or more neighbor cells; and
averaging the signal level threshold values of each of the two or more neighbor cells to determine the call re-establishment signal level threshold;
detecting a failure of a connection between the UE and the serving cell;
comparing the signal level between the UE and a serving cell to the call re-establishment signal level threshold;
when the signal level between the UE and a serving cell exceeds the call re-establishment signal level threshold, initiating call re-establishment on a target cell, the target cell being a neighbor cell of the serving cell; and
when the signal level between the UE and a serving cell does not exceed the call re-establishment signal level threshold, not initiating call re-establishment.

10. The method of claim 9, wherein the call re-establishment signal level threshold is encoded within a system information type 21bis message.

11. The method of claim 9, wherein the call re-establishment signal level threshold is encoded within a system information element.

12. The method of claim 11, wherein the information element indicates whether call re-establishment can be initiated in the event of at least one of a radio link failure and a protocol failure.

13. The method of claim 9, including detecting a protocol failure, wherein the protocol failure includes an error condition selected from the group consisting of abnormal release—unspecified, abnormal release—channel unacceptable, abnormal release—timer expired, abnormal release—no activity on the radio path, lower layer failure, protocol error—unspecified, handover impossible—timing advance out of range, and call already cleared.

14. The method of claim 9, wherein the call re-establishment signal level threshold is equal to a minimum signal level required on the target cell.

15. A user equipment (UE) for implementing call re-establishment and configured to communicate with a wireless communication network, comprising:
a processor, the processor being configured to:
determine a signal level between the UE and a serving cell;
receive signal level threshold values for two or more neighbor cells; and
average the signal level threshold values of each of the two or more neighbor cells to determine a call re-establishment signal level threshold;
detect at least one of a radio link failure and a protocol failure of a connection between the UE and the serving cell;
compare the signal level between the UE and the serving cell to the call re-establishment signal level threshold;
when the signal level between the UE and the serving cell exceeds the call re-establishment signal level threshold, initiate call re-establishment by:
selecting a target cell of the wireless communication network, the target cell being a neighbor cell of the serving cell;
comparing a received signal level for the target cell to a signal level threshold of the target cell, wherein the signal level threshold of the target cell is greater than the call re-establishment signal level threshold; and
when the received signal level for the target cell exceeds the signal level threshold of the target cell, initiating call re-establishment on the target cell; and
when the signal level between the UE and the serving cell does not exceed the call re-establishment signal level threshold, not initiate call re-establishment.

16. The UE of claim 15, wherein the call re-establishment signal level threshold is encoded within a system information type 21 bis message.

17. The UE of claim 15, wherein the call re-establishment signal level threshold is encoded within a system information element.

18. The UE of claim 17, wherein the information element indicates whether call re-establishment can be initiated in the event of at least one of a radio link failure and a protocol failure.

19. The UE of claim 15, wherein the call re-establishment signal level threshold is equal to a minimum signal level required on the target cell.

* * * * *